United States Patent
Klehn et al.

(10) Patent No.: US 7,489,931 B2
(45) Date of Patent: Feb. 10, 2009

(54) METHOD FOR THE IDENTIFICATION OF A SERVICE

(75) Inventors: Norbert Klehn, Falkensee (DE); Robert Zaus, München (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/495,868

(22) PCT Filed: Nov. 19, 2001

(86) PCT No.: PCT/DE01/04389

§ 371 (c)(1),
(2), (4) Date: Nov. 19, 2004

(87) PCT Pub. No.: WO03/049477

PCT Pub. Date: Jun. 12, 2003

(65) Prior Publication Data

US 2005/0096056 A1 May 5, 2005

(51) Int. Cl.
*H04Q 7/20* (2006.01)
*H04Q 7/22* (2006.01)
*H04M 1/00* (2006.01)

(52) U.S. Cl. .............. 455/445; 455/414.2; 455/422.1; 455/461; 455/466; 455/550.1

(58) Field of Classification Search ... 455/432.1–432.3, 455/414.1, 414.2, 414.4, 422.1, 426.2, 433, 455/434, 435.1, 435.2, 436, 439, 445, 452.1–452.2, 455/551, 553.1, 554.2, 560–561, 415, 423–425, 455/450, 458, 466, 517, 550.1, 552.1, 556.2, 455/566–567; 370/216, 522, 524, 219, 229, 370/230, 395.5–395.54, 395.61, 902–906, 370/911, 913; 379/9.01
See application file for complete search history.

(56) References Cited

U.S. PATENT DOCUMENTS

| | | | | | |
|---|---|---|---|---|---|
| 5,504,804 A | * | 4/1996 | Widmark et al. | ........... | 455/63.2 |
| 5,901,352 A | * | 5/1999 | St-Pierre et al. | .......... | 455/426.1 |
| 5,920,822 A | * | 7/1999 | Houde et al. | ................. | 455/466 |
| 5,940,759 A | * | 8/1999 | Lopez-Torres et al. | ...... | 455/433 |
| 6,005,859 A | * | 12/1999 | Harvell et al. | ................ | 370/352 |
| 6,175,576 B1 | * | 1/2001 | Boakye et al. | .............. | 370/524 |
| 6,363,144 B1 | * | 3/2002 | Becher et al. | .......... | 379/211.01 |
| 6,408,181 B1 | * | 6/2002 | Ho et al. | ................... | 455/432.1 |
| 6,600,917 B1 | * | 7/2003 | Maupin | .................... | 455/414.1 |
| 6,615,042 B1 | * | 9/2003 | Britt et al. | .................... | 455/433 |
| 6,625,461 B1 | * | 9/2003 | Bertacchi | ..................... | 455/466 |
| 6,728,217 B1 | * | 4/2004 | Amirijoo et al. | ............. | 370/252 |
| 6,850,758 B1 | * | 2/2005 | Paul et al. | ................. | 455/422.1 |
| 2001/0031635 A1 | * | 10/2001 | Bharatia | ...................... | 455/432 |
| 2002/0196775 A1 | * | 12/2002 | Tuohino et al. | .............. | 370/352 |

FOREIGN PATENT DOCUMENTS

GB        2 347 305 A   *   8/2000

* cited by examiner

Primary Examiner—Meless N Zewdu

(57) ABSTRACT

The invention relates to a method for the identification of a service, requested by a call to a mobile communication unit from and/or via a fixed network and via a mobile communication network. All available part information relating to the carrier capabilities specific to the service are collected, collated and evaluated for the identification of the service and transmitted to the mobile communication unit.

11 Claims, 1 Drawing Sheet

METHOD FOR THE IDENTIFICATION OF A SERVICE

CLAIM FOR PRIORITY

This application is a national stage of PCT/DE01/04389, published in the German language on Jun. 12, 2003, which was filed on Nov. 19, 2001.

TECHNICAL FIELD OF THE INVENTION

The present invention relates to a method for identification of a service, and in particular, requested by a call to a mobile communications unit from and/or via a landline network and via a mobile communications network.

BACKGROUND OF THE INVENTION

In digital mobile communications networks and in PLMNs (Public Land Mobile Network), for example in a GSM or an UMTS network, a call to a communications unit, by means of which a specific service is requested, is generally signaled in advance in a so-called call set-up phase to the communications unit. This means that specific information is transmitted for the call and for the service. Requested services may in this case be, for example, a speech service, a data service or a fax service. Prior signaling is used to provide a network and/or a terminal, such as a mobile communications unit, with the capability to check whether the requested service can be supported or whether a user is in fact authorized to use a specific service. Furthermore, the appropriate precautions for setting up the call can be taken on the basis of call signaling such as this. The information which is specific for a call or for a service which is being requested by a call is in general signaled in a signaling message, a so-called call set-up message.

In this case, it is in turn associated with well-defined information elements, depending on the nature of the information. One of the information elements contains all of the call-specific and/or service-specific bearer capabilities, and this is referred to as the BC (Bearer Capability). A second information element is referred to as LLC (Low Layer Compatibility), and a third is referred to as HLC (High Layer Compatibility). These information elements must be provided by the communications unit from which the call originates. While LLC and HLC information elements are transparent while they are being transported through the networks to be passed through, the BC information element may vary depending on the requirements of the individual networks. For example, different BC information elements are defined for an ISDN and a PLMN. These BC information elements are mapped onto one another at interfaces between the various networks.

One problem in this case is that the supplied information elements to be mapped are generally not complete. Either the communications unit originating the call does not provide all of the information expected by the communications unit receiving the call, or a network to be passed through is not able to transport the information. The latter is the case, for example, when the networks to be passed through include an analog network, such as a PSTN (Public Switched Telephone Network) or national versions of ISDN signaling mechanisms. In the situation where the communications unit receiving the call is a mobile communications unit, it is problematic for the mobile communications network to determine which service is being requested by the call.

GSM/UMTS Standards in this case specify two different mechanisms, with one of the mechanisms being referred to as the single-numbering scheme, and the second as the multi-numbering scheme.

In the case of the single-numbering scheme, a user or a mobile communications unit receives only one number, which is valid for all the services which the user is authorized to use. In this case, it is assumed that a requested service from a landline network can be identified, for example, by means of the information which is supplied by the information elements BC, LLC, HLC. The information element BC (referred to for short in the following text just as BC) which, by way of example, is received from ISDN, is mapped onto a PLMN BC in the PLMN, that is to say, to be more precise, in a Mobile Switching Center (MSC), Visited Mobile Switching Center (VMSC), which is responsible for the mobile communications unit at the time at which the call was set up. This PLMN BC is sent to the mobile communications unit when it is complete. According to the GSM/UMTS Standards, it is not permissible to send an incomplete BC to the mobile communications unit. If the PLMN is not able to create a complete BC, then no BC is sent to the mobile communications unit. In this case, the mobile communications unit must select the service without having any information relating to the service. If the service which is selected by the mobile communications unit does not correspond to the service coming from the landline network, then the call requesting the service is rejected. If, by way of example, the mobile communications unit selects a speech service but a data service is coming from the landline network by means of a modem, then no call is set up. The single-numbering scheme can thus be used well when the landline network supplies sufficient information to make it possible to create a complete BC.

In the case of the multi-numbering scheme, a user or a mobile communications unit receives different numbers, specifically for each service which he is authorized to use, one and only one. In consequence, the communications unit from which a call to request a service originates dials the specific service just by entering an appropriate number. A corresponding complete PLMN BC which is associated with that number, is stored in an HLR (Home Location Register) in the PLMN. In this case, each number is associated with one, and only one PLMN BC. The complete PLMN BC which identifies the requested service is sent to a mobile communications unit receiving the call. In this case, it may be passed from the HLR via a VLR (Visitor Location Register) and the Visited Mobile Switching Center (VMSC) to the mobile communications unit. The multi-numbering scheme can be used when the landline network cannot supply sufficient information.

The advantage of the single-numbering scheme is the fact that numbers are saved. The disadvantage is that, in the situation where it is not possible to create a complete BC, the mobile communications unit has to select a service without any information.

The multi-numbering scheme has the advantage that the mobile communications unit receives a complete service-specific BC. However, in this case, a very large range of numbers must be made available for one and the same user, specifically one number for each service which the user may use. This disadvantage becomes more significant as the range of numbers which can be allocated is restricted, and the number of users in the present-day networks is increasing continuously.

SUMMARY OF THE INVENTION

In one embodiment of the invention, there is a method while allocating a minimum number of numbers for one and the same user of a mobile communications unit, to allow a service to be identified precisely with as high a probability as possible, that is to provide information which is as complete as possible relating to bearer capabilities which are specific for a service or for a corresponding call.

In another embodiment of the invention, there is a method for identification of a service, requested by a call to a mobile communications unit from and/or via a landline network and via a mobile communications network in which all of the available information elements relating to the bearer capabilities which are specific for that service are collected, are collated, are assessed for identification of the service, and are signaled to the mobile communications unit. The mobile communications network is in this case generally a so-called PLMN (Public Land Mobile Network), as already mentioned. The landline network may, for example, be an ISDN (Integrated Services Digital Network) or a PSTN (Public Switched Telephone Network).

In one preferred embodiment of the method according to the invention, an additional information element is provided in a signaling message (call set-up message) to the mobile communications unit with information elements (LLC, HLC, BC) which are specific for that call, in which all the available, gathered information elements relating to the bearer capabilities which are specific for that call are collated. This additional information element will be referred to as BACKUP in the following text. While, on the basis of the GSM/UMTS Standards, it is not permissible to send an incomplete BC to a mobile communications unit, the BACKUP which is provided according to the invention may also have incomplete information relating to the bearer capabilities which are specific for a call. In comparison to no BC, the BACKUP which is sent in the signaling message, the so-called call set-up message as already mentioned in the introduction, to the mobile communications unit, means that there is a very much higher probability that the network and/or the mobile communications unit can identify the call and can check in a corresponding manner whether it can support the service corresponding to the call and/or whether the user is authorized to use that service. If required, appropriate precautions may be taken in order to receive the call. Furthermore, the user has only a single number, which is associated with him for all the services, and this has the advantage that the operator of the mobile communications network, that is to say in general of the PLMN, can save numbers.

In a further preferred embodiment of the method according to the invention, the additional information element (BACKUP) is created in a Visited Mobile Switching Center (VMSC) in the mobile communications network. As already mentioned, the user or the mobile communications unit is allocated a number, which is stored in a corresponding HLR (Home Location Register). If a call for this number now arrives in the PLMN at a Gateway Mobile Switching Center (GMSC) then the GMSC turns to a responsible HLR in order to determine the location of the mobile communications unit of the user being called. To do this, the HLR in turn uses a request message (provide roaming number) to request a so-called roaming number from a corresponding VLR (Visitor Location Register) which is responsible for the present location of the user. This roaming number allows the call to be passed on to the VMSC which is responsible for the mobile communications unit, so that the VMSC receives the originally signaled information. At the same time, the HLR has used the request message to the VLR to also supply all of the available information relating to the bearer capabilities which are specific to that call. Depending on the implementation, this is either the originally received information (ISDN BC) or the PLMN BC formed in the HLR. In the latter case, the PLMN BC is not supplied unless it is complete. A VMSC which is responsible for the mobile communications unit calls up this information from the VLR. If the VMSC is not able to form a complete PLMN BC on the basis of the received information, it thus creates the additional information element BACKUP, which it then sends to the mobile communications unit in a signaling message.

In another preferred embodiment, the additional information element (BACKUP) may in fact also be created in a responsible HLR. It is then supplied to the VLR in the request message as mentioned above, from where it is then available to the VMSC.

All the information which is included in the additional information element is preferably obtained from the landline network, that is to say for example from an ISDN or PSTN and/or from the mobile communications network, that is to say in general a PLMN. An ISDN provides at least one ITC (Information Transfer Capability) information item. This parameter indicates whether a transmission bearer is being requested for speech (ITC="speech"), for analog data transmission, for example by means of modems (ITC="3.1 kHz Audio"), or is being requested for digital data transmission (ITC="UDI"). It is likewise possible to tell whether a synchronous (that is to say bit-oriented) or asynchronous (that is to say character-oriented) data transmission method is being requested. The parameter HLCI (High Layer Characteristics Information) in the HLC information element denotes a desired application. For example, facsimile is identified by HLCI="Facsimile GR.3". HLCI="Telephony" characterizes a telephone call. The parameter UR (User Rate) is used to signal requested transmission rates. Information which the PLMN provides relates to standard settings and to preferred values which are used in the PLMN. Examples are the indication of available and preferred radio channel codings, transmission qualities (with or without a data security protocol) or maximum transmission rates.

In one particularly preferred embodiment of the method according to the invention, a digital PLMN, in particular a GSM or a UMTS network, is selected as the mobile communications network.

In a further preferred embodiment of the method according to the invention, in an HLR of the mobile communications network, a specific number of different services are associated with one number such that identification of the service is possible, and this is signaled to the mobile communications unit with the additional use of the available, collected and collated information elements relating to bearer capabilities which are specific for that service. A complete BC can be generated and can be sent to the mobile communications unit.

In this case, information which is stored in an HLR is used highly effectively. If, for example, a call arrives from an ISDN, then a certain amount of information, such as an ITC, is intrinsically signaled, and can be assessed in the HLR. By way of example, a user is allocated one number in the HLR for a number of services. With the assistance of the information which is provided from the landline network, such as the ISDN, the HLR is in most cases able to uniquely identify a call or a corresponding service, and thus to set up a complete BC for the mobile communications network, that is for example a PLMN BC, and to send this to the mobile communications unit. In a small number of cases, in which the information which comes from the landline network is not sufficient in order to identify a service, a user or a mobile communications unit is allocated two or more numbers, although each number is once again responsible for two or more services. In contrast to the multi-numbering scheme mentioned initially, a user or a mobile communications unit is, according to the invention, allocated as many numbers as is necessary in order to make it possible for the landline network to identify a requested service with the assistance of the information supplied to the HLR. This means that the method ensures that numbers are allocated as effectively as possible and that an operator of the mobile communications network uses fewer numbers than in the case of the multi-numbering scheme.

Unique identification is preferably possible in this preferred embodiment of the method according to the invention.

For the situation where unique identification is actually not possible, that is in which, despite information being available from the landline network for identification purposes, it is not possible to select possible services, it is feasible according to the invention (instead of allocating further numbers to a user) to create the additional information element (as was provided in the first described preferred embodiment of the method), referred to as BACKUP, in the HLR itself, and to fill this with the information which is available in the HLR. This is, on the one hand, the information from the landline network (for example ITC) and the selection (which is already somewhat restricted by the number allocation process) of possible services. If this BACKUP is sent in a signaling message to the mobile communications unit, then the probability of the mobile communications unit being able to identify the correct service may be considerably higher than, for example, in the case of the single-numbering scheme mentioned initially. The combination of the two proposed preferred embodiments of the method according to the invention thus results in a third preferred embodiment of the method according to the invention.

BRIEF DESCRIPTION OF THE INVENTION

Further advantages of the invention will be explained in more detail with reference to the following exemplary figures, in which.

DETAILED DESCRIPTION OF THE INVENTION

Figure 1:
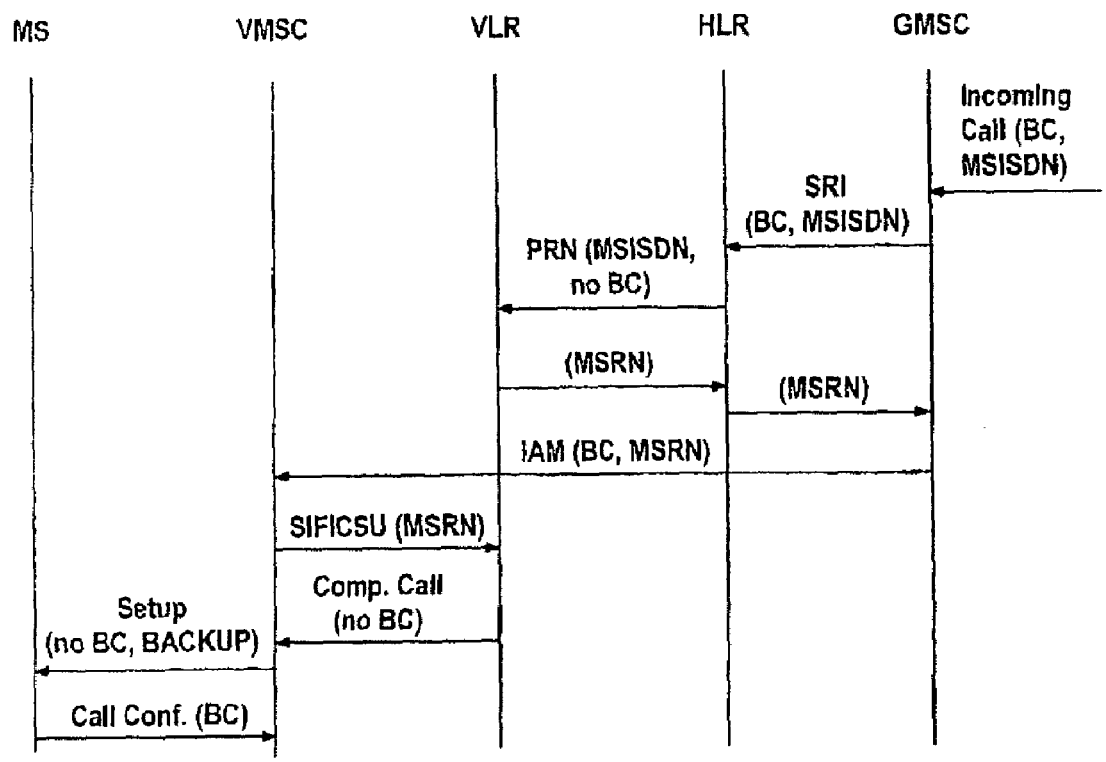
FIG. 1 shows a procedure for one embodiment of the method according to the invention.

FIG. 1 schematically illustrates which individual steps are carried out in a mobile communications network, such as a PLMN, when a call arrives from a landline network, such as an ISDN. The call which arrives from the ISDN and is directed to a mobile communications unit MS, and which is identified by a specific information element (which is specific for the ISDN) with regard to the bearer capability, that is an ISDN-BC, and a number MSISDN which has been allocated to the mobile communications unit MS, is first of all passed to a so-called Gateway Mobile Switching Center (GMSC). The GMSC now attempts to determine the location of the mobile communications unit, that is to say to determine the address (number) of the MSC which is at present controlling that mobile communications unit. This MSC is called the Visited Mobile Switching Center (VMSC). In order to determine the location of the mobile communications unit, the GMSC first of all sends a routing information message SRI (Send Routing Information) to an HLR (Home Location Register) which is responsible for that mobile communications unit MS. This routing information message also includes the ISDN-BC and the MSISDN. The HLR now has the task of determining the location of the user being addressed via the MSISDN, including his mobile communications unit, and it also has the task of determining whether the user is allowed to use the service being requested by the call. This necessitates a PLMNBC which describes this requested service. This PLMNBC can be generated, as described initially, in accordance with the two standardized methods, that is to say the single-numbering scheme and the multi-numbering scheme. As was likewise described in the introduction, this is generally not possible, or is associated with undesirable boundary conditions. For the description of this preferred embodiment of the method according to the invention, it is therefore assumed that the HLR is not able to generate a complete PLMN-BC. Accordingly, no PLMN BC is generated in accordance with the GSM/UMTS Standards. The PLMN can therefore not unambiguously determine which mobile-radio-specific service is being requested. In order to carry out the task of determining the location of the mobile communications unit, the HLR uses a further message PRN (Provide Roaming Number) to request a so-called roaming number from a VLR (Visitor Location Register) which is responsible for the MS, with the aid of which roaming number the mobile communications unit MS can be located. The MSISDN is now still admittedly included in the message PRN, but no BC. The VLR then sends a roaming number for the mobile communications unit MS (MSRN) back to the HLR. The HLR passes on this roaming number MSRN to the Gateway Mobile Switching Center (GMSC), from where the original signaling message IAM (Initial Address Message) received from the landline network is sent to a Visited Mobile Switching Center (VMSC) which is responsible for the MS, with the message IAM including not only the information relating to the ISDN-BC but also the Mobile Station Roaming Number MSRN. In a further message, the so-called SIFICSU (Send Information For Incoming Call Set Up), the VMSC now requests the VLR for the PLMN BC which may have been generated by the HLR, and which is intended to be included in a signaling message (call set-up message) to the mobile communications unit. However, as described above, the VLR cannot supply a complete PLMNBC. The VMSC then generates an additional information element, a so-called BACKUP. This BACKUP includes all of the available information relating to the bearer capabilities which are specific for that call and for the service being requested by that call. This BACKUP is then sent in the call set-up message together with other information elements to the mobile communications unit. By means of this incomplete information relating to the bearer capabilities which are specific for that call and for the service being requested by that call, there is now a greater probability of the mobile communications unit MS being able to identify the correct service than would be the case without any information. The additional information element BACKUP is defined as a new optional parameter for the call set-up message. This makes it possible for older mobile communications units, which do not know this new functionality, to ignore this parameter and to set up the call as normal. The method according to the invention is thus backwards-compatible, that is it can be implemented retrospectively in existing mobile communications networks.

Figure 2:
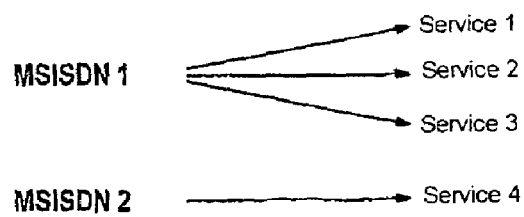
FIG. 2 shows a number allocation process in an HLR in a mobile communications network according to a further preferred embodiment of the method according to the invention.

FIG. 2 shows a number allocation process in an HLR in a mobile communications network, such as a PLMN. A user of a mobile communications unit MS is in the present exemplary embodiment allocated two numbers, specifically MSISDN 1 and MSISDN 2. The user of the mobile communications unit MS is authorized to make use of four different services. MSISDN 1 can in this case be dialed for three different services, for example for a speech service, a FAX service and a data service. A fourth service, such as a digital multimedia service, is dialed and requested using MSISDN 2. If MSISDN 1 is now dialed, then the HLR is able with the assistance of the signaling information from the ISDN to distinguish between the three services and to select from these three services which service is being requested by the call. It can thus uniquely identify the services on the basis of the signaling information provided by the ISDN. If a digital multimedia service is being requested, then MSISDN 2 must be dialed, since the signaling information from the ISDN is the same as, for example, in the case of a digital data service. To this extent, if the MSISDN were the same, the HLR would not be able to decide whether this was one service or the other. In this case, the signaling information from the landline network, that is in this case the ISDN, is not sufficient to make it possible to ensure unique identification of a service. An additional number MSISDN 2 is then allocated. In contrast to the multi-numbering scheme, however, a number is not allocated for each service without taking account of the signaling information from the landline network, but only when the signaling information from the landline network is not adequate. The available information relating to the bearer capabilities which are specific for that call or for the service being requested by that call is used and is assessed effectively.

What is claimed is:

1. A method for identification of a service requested by a call to a mobile communications unit from a fixed network and/or over a fixed network and/or over a mobile communications network, comprising:
    collecting and merging available partial information with respect to bearer capabilities specific for the service in an additional information element in case complete information with respect to the bearer capabilities is not available and a complete information element including the complete information can therefore not be provided;
    transmitting the additional information element instead of the complete information element in a signaling message to the mobile communications unit with information elements specific for the service; and
    utilizing the additional information element by the mobile communications unit for the identification of the service.

2. The method as claimed in claim 1, wherein the additional information element is provided as a backwards-compatible element.

3. The method as claimed in claim 1, wherein the additional information element is created in a VMSC.

4. The method as claimed in claim 1, wherein the additional information element is created in an HLR.

5. The method as claimed in claim 1, wherein the additional information element obtains the information which it comprises from the landline network and/or from the mobile communications network.

6. The method as claimed in claim 1, wherein, in an HLR of the mobile communications network, a specific number of different services are associated with one number to enable identification of the service, and this is signaled to the mobile communications unit with the additional use of the available and collected information elements relating to bearer capabilities which are specific for that service.

7. The method as claimed in claim 6, wherein unique identification is possible.

8. The method as claimed in claim 1, wherein a GSM or a UMTS network is selected as the mobile communications network.

9. The method as claimed in claim 1, wherein an ISDN is used as the landline network.

10. The method as claimed in claim 1, wherein a PSTN is selected as the landline network.

11. A system for identification of a service requested by a call to a mobile communications unit from a fixed network and/or over a fixed network and/or over a mobile communications network, comprising:
    a collecting unit for collecting and merging available partial information with respect to bearer capabilities specific for the service in an additional information element in case complete information with respect to the bearer capabilities is not available and a complete information element including the complete information can therefore not be provided;
    a transmission unit for transmitting the additional information element instead of the complete information element in a signaling message to the mobile communications unit with information elements specific for the service; and
    a utilizing unit for utilizing the additional information element by the mobile communications unit for the identification of the service.

* * * * *